United States Patent
Bailiang

(10) Patent No.: US 11,402,232 B2
(45) Date of Patent: Aug. 2, 2022

(54) OFF-VIEWPORT LOCATION INDICATIONS FOR DIGITAL MAPPING

(71) Applicant: Google LLC, Mountain View, CA (US)

(72) Inventor: Zhou Bailiang, Seattle, WA (US)

(73) Assignee: GOOGLE LLC, Mountain View, CA (US)

( * ) Notice: Subject to any disclaimer, the term of this patent is extended or adjusted under 35 U.S.C. 154(b) by 431 days.

(21) Appl. No.: 16/380,763

(22) Filed: Apr. 10, 2019

(65) Prior Publication Data
US 2019/0316931 A1 Oct. 17, 2019

(51) Int. Cl.
G01C 21/36 (2006.01)
G01C 21/32 (2006.01)

(52) U.S. Cl.
CPC ......... G01C 21/3682 (2013.01); G01C 21/32 (2013.01); G01C 21/3691 (2013.01)

(58) Field of Classification Search
CPC . G01C 21/3682; G01C 21/32; G01C 21/3691
See application file for complete search history.

(56) References Cited

U.S. PATENT DOCUMENTS

| | | | | |
|---|---|---|---|---|
| 8,032,297 | B2 * | 10/2011 | Jakobson | G01C 21/3682 340/995.14 |
| 2010/0115459 | A1 | 5/2010 | Kinnunen et al. | |
| 2012/0197714 | A1 * | 8/2012 | Beyeler | G01C 21/367 705/14.49 |
| 2015/0130845 | A1 | 5/2015 | Otero et al. | |
| 2017/0091901 | A1 * | 3/2017 | Lee | G06T 3/60 |
| 2018/0259356 | A1 * | 9/2018 | Rolf | G01C 21/3682 |

FOREIGN PATENT DOCUMENTS

| | | |
|---|---|---|
| CN | 107544790 | 1/2018 |
| JP | 6261474 | 1/2018 |

OTHER PUBLICATIONS

Baudisch et al., "Halo: A Technique for Visualizing Off-Screen Locations", Conference on Human Factors in Computing Systems, vol. 5, No. 1, Fort Lauderdale, Florida, Apr. 5-10, 2003, pp. 481-488.
International Search Report & Written Opinion from PCT/US2018/027057, dated Jun. 5, 2018, 14 pages.
International Preliminary Report on Patentability for Application No. PCT/US2018/027057, dated Jun. 15, 2020, 13 pages.

* cited by examiner

*Primary Examiner* — Ig T An
(74) *Attorney, Agent, or Firm* — Dority & Manning, P.A.

(57) ABSTRACT

Systems and methods for providing map data of a selected region and supplemental data associated with one or more locations outside of the selected region are disclosed. A computing system can initiate a request for map data associated with a selected region of a mapped region. The one or more requests can be associated with one or more search criteria. The computing system can receive the map data associated with the selected region and supplemental data associated with a subset of records. Each record may satisfy the one or more search criteria and be associated with a respected location outside of the selected region. The computing system can present, within a viewport of a digital mapping application, the map data of the selected region and a visual indication of the supplemental data associated with the subset of records.

15 Claims, 10 Drawing Sheets

OFF-VIEWPORT LOCATION INDICATIONS FOR DIGITAL MAPPING

PRIORITY CLAIM

The present application is based upon and claims the right of priority to International Application No. PCT/US2018/027057, filed on Apr. 11, 2018, the disclosure of which is hereby incorporated by reference herein in its entirety for all purposes.

FIELD

The present disclosure relates generally to mapping applications that provide and/or display map data associated with a geographic area.

BACKGROUND

A geographic information system (GIS) is a system for archiving, retrieving, and manipulating data that has been stored and indexed according to the geographic coordinates of its elements. The system generally can utilize a variety of data types, such as imagery, maps, and tables. GIS technology can be integrated into Internet-based mapping applications.

Such mapping applications can be, or can otherwise be associated with, software applications that display interactive digital maps. For example, mapping applications may run on laptop and tablet computers, mobile phones, car navigation systems, hand-held global positioning system (GPS) units, etc. Many of these devices are equipped with a touchscreen, a touchpad, or are otherwise configured to receive input that includes finger gestures. A user may, for example, may pan across a map by swiping her finger in the desired direction, zoom in on an area by pinching two fingers together, etc.

In general, a mapping application can display various types of geographic data including topographical data, street data, urban transit information, and traffic data. Further, the geographic data may be schematic or based on photography, such as satellite imagery. Still further, a mapping application can display the information in a two-dimensional (2D) or three-dimensional (3D) format.

SUMMARY

Aspects and advantages of embodiments of the present disclosure will be set forth in part in the following description, or may be learned from the description, or may be learned through practice of the embodiments.

One example aspect of the present disclosure is directed to a computing system for providing map information. The computing system comprises one or more processors and one or more tangible, non-transitory, computer readable media that store instructions that when executed by the one or more processors cause the computing system to perform operations. The operations comprise initiating one or more requests to one or more databases for map data associated with a selected region of a mapped region. The one or more requests are associated with one or more search criteria. The operations further comprise receiving, in response to the one or more requests, the map data associated with the selected region and supplemental data associated with a subset of a plurality of records. Each of the plurality of records is associated with the one or more search criteria and a respective record location outside of the selected region. The operations further comprise presenting, within a viewport of a digital mapping application, the map data of the selected region, each point of the viewport corresponds to a respective point of the selected region. The operations further comprise presenting, within the viewport with the map data, at least one visual indication of the supplemental data associated with the subset of records.

Other example aspects of the present disclosure are directed to systems, apparatus, computer program products (such as tangible, non-transitory computer-readable media but also such as software which is downloadable over a communications network without necessarily being stored in non-transitory form), user interfaces, memory devices, and electronic devices for displaying map data within a user interface.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
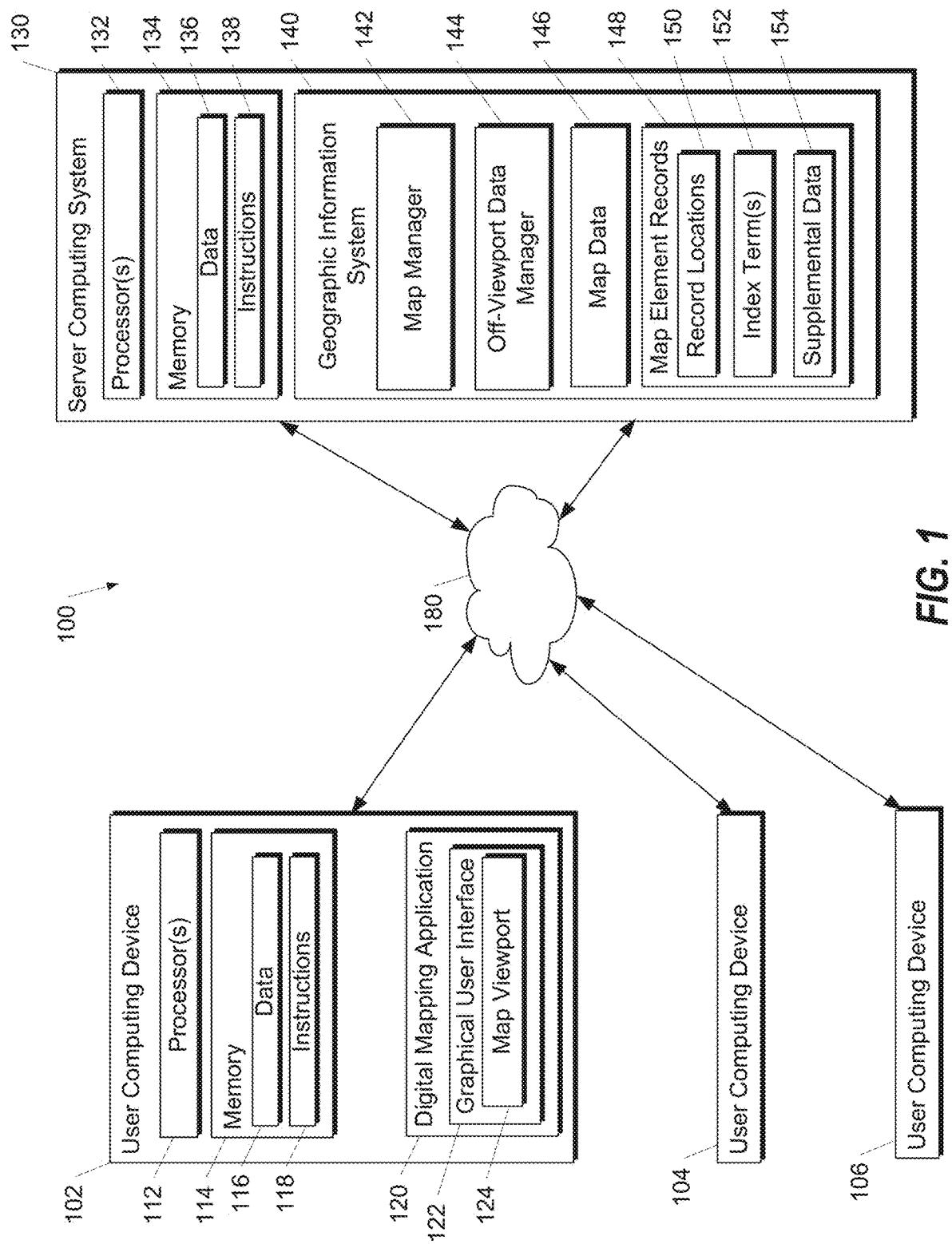
FIG. 1 depicts a block diagram of an example system for obtaining and presenting visual indications of locations outside of a selected region currently displayed by a digital mapping application.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally, the present disclosure is directed to systems and methods for presenting visual indications of supplemental data relating to a subset of locations that are related to search criteria, but are outside of a selected region of a map that is currently displayed within a map viewport. For example, a communications device may include a digital mapping application that provides a graphical user interface including a map viewport in which a map is displayed according to digital mapping data. In accordance with embodiments of the disclosed technology, the graphical user interface may display data for locations that are outside of a selected region that is currently displayed within the map viewport. More particularly, the map viewport of the graphical user interface may simultaneously display map data for a selected region and supplemental data for one or more locations that are outside of the selected region currently displayed within the map viewport. The supplemental data may be for less than all of the locations outside of the selected region that are associated with search criteria. In this manner, the digital mapping application may provide map data for a selected region, while simultaneously alerting a user to additional information relating to locations outside of the currently displayed region. In this manner, embodiments of the present disclosure provide techniques for improving the display of map information, particularly where the size of a screen or map viewport provided by a graphical user interface is limited.

The presentation of map data on a screen of a communications device, to a user of the communications device, may present challenges due to a mismatch between the size of a geographical area in the real world for which map data is available ("a mapped region"), and a limited size of the screen. Typically, the screen is arranged to display map data relating only to a portion of the mapped region. This portion of the mapped region may be referred to as "a selected region." A linear mapping can be defined between real-world points of the selected region, and points on the screen. Elements of the map data can be displayed on the screen at respective points defined by the mapping. The scale of a map displayed on the screen may be defined as the ratio of (i) a length on the screen which represents a real-world distance in the selected region, to (ii) that real-world distance. The scale should be sufficiently high so that the map data for the selected region is comprehensible to the user. However, the scale may also limit the size of the selected region, due to a constraint that the selected region is to be represented on the screen.

With traditional graphical user interfaces, a user may be unable to access portions of the map data which do not correspond to the currently selected region displayed on the screen. In other words, the size of the screen of the communication device may place an undesirable limitation on the portion of the real-world map data which can be accessed at any given time.

If a user varies the selected region (e.g. if the user pans the selected region within the mapped region, or if the user reselects the scale), the result may be confusing. For example, certain users may have difficulty visualizing the relationship between a previously selected region and a currently selected region. Other users may find it difficult to remember map data from a previously selected region.

Furthermore, many mapping applications may use multiple "data layers," for example with a lowest data layer indicating major roads, and successively higher data layers indicating respectively more minor roads, railroads, airports, and geographic names. According to the selected scale, the communications device typically presents a differing subset of these data layers. If the user reduces the scale of the map, this may cause a given data layer not to be displayed, making the data of that data layer harder to access by the user. Thus, for example, if a user is interested in obtaining information which is part of a given data layer, she may be required to choose a sufficiently large scale such that the data layer is displayed. This in turn, may limit the size of the selected region due to the limited screen size. At a certain scale, the distance between two points in the mapped region (e.g. the end-points of a journey the user wishes to make) may be much longer than the width of the selected region which can be represented on the screen. Accordingly, a user who wishes to review the information in the given data layer relating to a trajectory in the mapped region between the two points, may be required to spend considerable time panning the map along the trajectory. During the panning process, the communication device may be required to obtain a large amount of map data from an external source, placing a high burden on the communications network which transfers the data, and draining the battery of the communication device. Even then, the user may not receive data relating to points in the mapped region which are close to the trajectory but happen not to be in the selected region at any time during the panning.

In accordance with example embodiments of the disclosed technology, a communications device can obtain and present data associated with one or more locations outside of a selected region displayed by a digital mapping application. The data for the one or more locations outside of the selected region may be simultaneously presented with map data for the selected region. For example, a graphical user interface of the digital mapping application may display map data for a selected region in a map viewport and simultaneously display data for one or more locations outside of the selected region. In some instances, the data for off-viewport locations may be presented within the map viewport with the map data. For example, the data for off-viewport locations may be displayed as an overlay of the map data for the selected region. In this manner, the graphical user interface is able to provide information to a user relating to locations outside of the selected region, without requiring the user to engage in user interface actions such as panning or rescaling.

In some examples, a communications device may obtain from one or more remote databases map data associated with a selected region of a mapped region. The communications device may display within a map viewport of a digital mapping application the map data for the selected region. The selected region may be selected at least partially based on data received from the user by the communications device (e.g. a user-selected location and a user-selected scale). The selected region may be auto-generated, e.g. as the portion of the mapped region which is centered on a location specified by the digital mapping application running on the communications device and which has a default size or a size specified by the application.

The communications device may additionally obtain supplemental data associated with one or more records corresponding to record locations outside of the selected location. The one or more records may be stored in one or more databases and contain information pertaining to map elements such as roads, signs, buildings, business or other organization locations, etc. The communications device may present the map data of the selected region within the viewport of the digital mapping application, where each point in the map viewport corresponds to a respective point of the selected region. The communications device may additionally present at least one visual indication of the supplemental data associated with the record locations outside of the selected region. The at least one visual indication can be presented at a location in a graphical user interface of the digital mapping application which is different from a respective record location outside of the selected region. In some examples, the visual indication is presented within the viewport with the map data of the selected region. In other examples, the visual indication can be presented in association with the map data but outside of the viewport.

In some examples, a visual indication of a record associated with a location outside of the selected region can indicate that the respective location is located outside of the selected region displayed within the viewport. For instance, the visual indication may include an arrow or other indication that the respective location of a record is outside of the selected region. The visual indication may indicate a direction of the respective location relative to a point within the selected region. In some examples, a visual indication may indicate the distance from a point of the selected region to a respective record location outside of the selected region.

In some implementations, the communications device can obtain and display supplemental data including real-time data associated with one or more record locations outside of a selected region being displayed by a digital mapping application of the communications device. For example, the real-time supplemental data may include current traffic condition data associated with traffic condition locations outside of the selected region. A visual indication of such off-viewport current traffic conditions can be provided in association with map data for the selected region. For example, the graphical user interface may display the visual indication over the map data of the selected region. The visual indication may indicate a direction, relative to the selected region being displayed, of the corresponding traffic condition location. The visual indication may indicate a time of delay associated with the traffic condition, and/or a distance between a point in the selected region and the traffic condition location.

In some implementations, the supplemental data may include a record cluster identifying a plurality of records corresponding to record locations outside of the selected region being displayed within the viewport. A visual indication of an off-viewport record cluster can be provided in association with the map data for the selected region. In some examples, the visual indication may indicate a direction of the record cluster relative to a point within the selected region. The visual indication may additionally or alternatively indicate the number of records in the record cluster. The number of record clusters may be predefined, or depend upon identified records (e.g. the number of identified records and/or their associated record locations). Additionally, the number of records included in a record cluster may be predefined, or depend upon identified records.

In some implementations, the supplemental data may include data selected based on a comparison of records matching search criteria and location criteria. For example, the supplemental data may be price, availability, or other third-party information determined from the record comparison. For instance, the supplemental data may identify a location of a business outside of the selected region, but that offers a good or service at a lower price based on a comparison to other businesses that satisfy the search criteria and location criteria. In this manner, data associated with particular locations outside of the selected region can be selectively displayed based on a comparison of records in order to present information that may be more useful to a user.

In some examples, the supplemental data may be associated with a subset of a plurality of records that satisfy one or more search criteria associated with a request for map data of a selected region. For example, a geographic information system remote from the communication device may identify a plurality of records that are associated with one or more search criteria. The geographic information system may determine that the plurality of records satisfy the one or more search criteria. The geographic information system may additionally determine that the plurality of records satisfy one or more location criteria. For instance, records associated with a respective record location that is outside of the selected region, but that is within a certain distance of a point within the selected region may be identified using a location criterion. The geographic information system can select a subset of the plurality of records based on a comparison of the plurality of records. The system can provide the supplemental data associated with the subset of the plurality of records to the remote communication device. The remote communication device can then display a visual indication of the supplemental data in association with a display of the map data of the selected region.

In some embodiments, the geographic information system can select the subset based on comparing supplemental data associated with the plurality of records. For example, a subset can be selected based on a comparison of current traffic conditions at traffic condition locations corresponding to the plurality of records. For instance, the system may select a traffic condition location associated with a longest time delay or one or more traffic condition locations having a time delay above a threshold time delay.

In another example, the subset can be selected based on a comparison of a price of a good or service offered at record locations corresponding to the plurality of records. In some implementations, the supplemental data may be price data associated with a good or service associated with each of the plurality of records. The system may select a subset of the plurality of records based on comparing the price at each of the plurality of record locations. For example, the system may select a record location associated with a lowest price. In another example, the system may select one or more record locations having a price below a threshold price. In this manner, the system can select from a plurality of record locations outside of the selected region supplemental data for display in association with the selected region based on price or other real-time data associated with the records.

In yet another example, the subset can be selected in order to create a record cluster including two or more records that satisfy a search criterion and location criterion. In some implementations, the geographic information system may compare the relative position of each record location outside of the selected region in order to select a subset of the plurality of records. For instance, the system may compare each record location in order to generate one or more record clusters. For example, the system may place two or more records in a record cluster based on the distance between the two or more respective record locations. More particularly, the system may create record clusters by grouping together records that have respective record locations that are close to one another.

In some implementations, a location criterion associated with a record cluster may include at least one distance criterion and/or at least one direction criterion. The distance criterion for a given record cluster may specify that the identified records of the cluster are associated with respective record locations which are within a specified distance from the selected region, and/or within a specified distance from a specific point in the selected region, and/or within a specified distance from each other. In each case, the specified distance may be predetermined, or may be variable, e.g. as function of at least one dimension of the selected region, or user specified, or calculated such that the number of records in the record cluster meets a certain criterion.

The direction criterion for a given record cluster may specify that the identified records of the record cluster are within a specified angular range about a central point of the selected region. The respective angular ranges of the record clusters may be non-overlapping, and/or may collectively span all angles about the central point of the selected region. Similarly, the angular range(s) may be predetermined or variable (e.g. user-selected, or dependent upon the number and/or record locations of the identified records). The angular ranges may be equal to each other (e.g. in the case of four clusters, each may be 90 degrees about the central point of the selected region).

A given record cluster may be associated with a direction relative to the selected region. That direction may, for example, be a direction which is within the associated angular range about the central point of the selected region. For example, it may be center of the angular range. Alternatively, the direction may be derived based on the record locations associated with the records of the record cluster, e.g. as the direction from a center point of the selected region towards an average of those record locations.

In some examples, if a single record is identified which has index terms which match the search criteria, and which meets the location criterion of a given record cluster, then the record cluster may not be defined. Optionally, a visual indication of the single record may be presented on the screen.

As an example, a computing system can be provided in accordance with example embodiments of the disclosed technology to present visual indications associated with locations outside of a selected region along with map data for the selected region based on search criteria. For instance, a computing system such as a communications device can initiate one or more requests to one or more remote databases for map data associated with the selected region. The selected region may be a portion of a mapped region. The one or more requests can be associated with one or more search criteria. The search criteria may include general search criteria such as a request for map data of a selected region, without specifying additional search parameters or terms. The search criteria may specify traffic condition criteria, such as to include traffic conditions in the selected region, or to include traffic conditions of a particular type within the selected region. The search criteria may specify that buildings, landmarks, businesses, etc. be included with or as part of the map data. In some examples, the search criteria may include more specific search criteria, such as a request for particular elements associated with the selected region, such as businesses of a particular type or particular traffic condition types in the selected region. The computing device can receive, in response to the one or more requests, map data associated with the selected region. Additionally, the communications device can receive supplemental data associated with a subset of records. The subset of records can be selected from a plurality of records satisfying the one or more search criteria and or one or more location criteria. The subset of records can be selected from the plurality based on a comparison of the plurality of records. In some examples, a remote geographic information system can select the subset of records and provide the supplemental data to the computing device. The computing device can present, within the viewport of the digital mapping application, the map data of the selected region. The map data for the selected region may be displayed according to a continuous mapping (e.g., a linear mapping) between points of the map viewport or other display area of a screen and real-world locations. Elements of the map data can be displayed within the viewport at respective points defined by the mapping. Additionally, the computing system can present within the viewport along with the map data, at least one visual indication of supplemental data associated with the subset of records.

In some examples, the respective record location of each of the subset of records can be a respective traffic condition location. The supplemental data can then be traffic condition data describing a corresponding current traffic conditions at the respective traffic condition location of each of the subset of records. Moreover, the at least one visual indication can include an indication of the corresponding current traffic condition at the respective traffic condition location of each of the subset of records. In some examples, the comparison of the plurality of records can include comparing the traffic condition data in order to select a subset of records for which the current traffic conditions are to be presented. In this manner, the computing device can selectively present data more likely to be of interest to the user. In some examples, the visual indication of a current traffic condition may include a time delay value indicative of the time delay currently experience by traffic traveling at the respective traffic condition location.

In some examples, the subset of records selected by the geographic information system includes two or more records from the plurality of records that match the one or more search criteria. The supplemental data can identify a record cluster including two or more records. The visual indication can include an identification of the record cluster. In some examples, the visual indication can indicate a number of the two or more records in a record cluster. A record cluster can be associated with a direction relative to a point within the selected region being displayed within the map viewport. The visual indication for the record cluster can indicate the direction.

According to example embodiments, a computing system can be provided to respond to one or more requests associated with map data of the selected region. For example, a computing system such as a server hosting a geographic information system may obtain in response to the one or more requests map data associated with the selected region. Additionally, the computing system may identify a plurality of records that satisfy one or more search criteria associated with the one or more requests. The plurality of records may additionally be identified based at least in part on satisfying a location criterion. Each of the plurality of records is associated with respective record location that is outside of the selected region. The computing system can select a subset of the plurality of records and supplemental data associated with the subset of records based on comparing the plurality of records. In response to the one or more user requests, the computing system can provide the map data and the supplemental data associated with subset of records.

One example includes presenting map data to a user of a communication device, where the communications device is operative to access one or more databases external to the communications device. The databases may be provided by a geographic information system hosted at one or more remote servers for example. Additionally or alternatively, the databases may be provided by a third-party service separate from a geographic information system. The one or more databases may include map data describing transport routes in the mapped region. The communications device may obtain from the database map data relating to the selected region which is a portion of the mapped region. The communications device can present the obtained map data in the display area of the screen of the communications device. The display area may correspond to a map viewport of a graphical user interface provided by a digital mapping application of the communications device. In some examples, each point of the display area may correspond to a respective point of the selected region under a continuous mapping. The communications device can obtain, for one or more traffic condition locations outside of the selected region, traffic condition data that describes respective current traffic conditions at the one or more traffic condition locations. Additionally, the communications device can present, for each of the one or more traffic condition locations, a respective visual indication which is indicative of the respective current traffic conditions at the traffic condition location. The visual indication can be presented at a location on the screen that is different than the traffic condition location under the mapping. In some examples, the visual indication can be presented within the display area on the screen, such as within the map viewport. In some examples, the traffic condition data can include a time delay value indicative of time delay currently experienced by traffic traveling in one direction at a corresponding traffic condition location. The respective visual indication for the corresponding traffic condition location can indicate the length of the time delay.

Another example of presenting map data is provided that includes obtaining map data and one or more records from one or more databases. For example, a communications device may be operative to access a first database external to the communications device to obtain map data describing transport routes in the mapped region. The communications device can be further operative to access the second database storing a plurality of records. Each record can be associated one or more respective index terms and with respective record location in the mapped region. The communications device can obtain from the first database, map data relating to the selected region which is a portion of the mapped region. The communications device can present the obtain map data in the display area of the screen of the communications device. Each point of the display area may correspond to a respective point of the selected region under a continuous mapping. The communications device can define one or more search criteria and initiate a search in a second database. The search may include identifying any records for which the respective index terms match the one or more search criteria. The search may additionally include identifying at least one record cluster. Each record cluster can be associated with a respective location criterion and include a respective plurality of the identified records for which the associated record locations are outside the selected region and meet the respective location criterion. The communications device can present on the screen a respective visual indication of the existence of the at least one record cluster. In some examples, the visual indication of the record cluster can be presented within the display area in which the map data is displayed.

The systems and methods of the present disclosure can provide a number of technical effects and benefits. For example, the systems and methods disclosed herein provide techniques that can be leveraged by computing systems including communications devices to improve graphical user interfaces that display map information. Additionally, the systems and methods disclosed herein provide techniques that can be leveraged by computing systems including servers such as those hosting geographic information systems to improve search results and the particular data provided in response to map-related requests. The systems and methods disclosed herein may provide particular improvements to existing systems where mobile or other computing devices having limited screen sizes and are used to provide map information and map-related information. The disclosed technology permits more relevant data to be retrieved for display on the communications device and for the display of more relevant information in an accessible manner.

By way of example, the disclosure can make it possible to mitigate the mismatch between physical limitations related to the size of a screen of a communications device, and the size of a mapped region for which map data exists. In particular, the disclosure can make it possible to present within a graphical user interface data relating to locations outside a selected region for which the communications device currently presents a map. This may be accomplished by displaying map data of the selected region according to a continuous mapping (e.g. a linear mapping) between points of a display area of a screen and real world locations, while simultaneously displaying visual indications relating to real-world positions which are outside of the selected region.

The visual indications may be displayed at locations of the screen which do not correspond to the real-world positions according to the mapping. For example, one or more of the visual indications relating to real-world positions outside of the selected region may be displayed within the display area along with the map data for the selected region. To express this more precisely, the display area may have an outer periphery (which may for example be a convex hull of all the points on the screen at which the map data is presented and which correspond to the selected region under the mapping), and the visual indications may be provided within this outer periphery. In other words, the display area may be used both to provide information about the selected area, and to provide information relating to location(s) outside the selected area. In some examples, the display area is a map viewport of a graphical user interface provided by a digital mapping application.

In this way, the communications device is able to alert a user to data concerning locations outside the selected region, without the user being required to perform a complex, time-consuming and confusing operation of changing the current selected region (e.g. by panning/re-scaling operations). This has the further advantage that the quantity of data which the communications device may need to obtain from external sources can be reduced. This can reduce the burden placed on the data communication network used to transfer the data to the communications device, and can extend the battery lifetime of the communications device. Similarly, data corresponding to locations outside the selected region can be obtained and presented in response to a single search, rather than requiring multiple different searches for regions other than the selected region, thereby reducing the total number of searches required to obtain the desired information and, as a result, reducing network traffic.

In some examples, embodiments of the disclosure may address an inability of a conventional communication device to present traffic condition data relating to traffic conditions at locations ("traffic condition locations") outside a selected region. In another example, embodiments of the disclosure may address an inability of a conventional communication device to indicate to the user the existence of multiple records which are identified as matching search criteria, and which are associated with respective locations ("record locations") outside the selected region. Because each visual indication may indicate a respective cluster of multiple records, the number of visual indications can be lower than the number of identified records, so that the display area may not be cluttered even in the case that the number of identified records is high.

In some implementations, in order to obtain the benefits of the techniques described herein, the user may be required to allow the collection and analysis of location information associated with the user or her device. For example, in some implementations, users may be provided with an opportunity to control whether programs or features collect such information. If the user does not allow collection and use of such signals, then the user may not receive the benefits of the techniques described herein. The user can also be provided with tools to revoke or modify consent. In addition, certain information or data can be treated in one or more ways before it is stored or used, so that personally identifiable information is removed. As an example, a computing system can obtain real-time location data which can indicate a location, without identifying any particular user(s) or particular user computing device(s).

With reference now to the figures, example aspects of the present disclosure will be discussed in greater detail.

FIG. 1 depicts a block diagram of an example computing environment 100 in which embodiments of the present disclosure may be practiced for providing and/or presenting data for locations outside of a selected region associated with map data that is currently displayed. The environment 100 can be implemented using a client-server architecture that includes a server computing system 130 that communicates with one or more user computing devices 102, 104, 106 (e.g., client devices) over a network 180. The environment 100 can be implemented using other suitable architectures, such as a single computing device or additional computing devices.

The environment 100 includes a server computing system 130, such as a web server and/or application server, etc. The server computing system 130 can host a geographic information system 140, such as a geographic information system associated with a mapping service. The server computing system 130 can be implemented using any suitable computing device(s). The server computing system 130 can have one or more processors 132 and one or more memory devices 134. The server computing system 130 can also include a network interface used to communicate with one or more user computing devices over the network 180. The network interface can include any suitable components for interfacing with one more networks, including for example, transmitters, receivers, ports, controllers, antennas, or other suitable components.

The one or more processors 132 can include any suitable processing device, such as a microprocessor, microcontroller, integrated circuit, logic device, or other suitable processing device. The one or more memory devices 134 can include one or more computer-readable media, including, but not limited to, non-transitory computer-readable media, RAM, ROM, hard drives, flash drives, or other memory devices. The one or more memory devices 134 can store information accessible by the one or more processors 132, including computer-readable instructions 138 that can be executed by the one or more processors 132. The instructions 138 can be any set of instructions that when executed by the one or more processors 132, cause the one or more processors 132 to perform operations. For instance, the instructions 138 can be executed by the one or more processors 132 to implement in map manager 142 and/or an off-viewport data manager 144. Thus, although shown separately from instructions 138, map manager 142 and/or off-viewport data manager 144 may be included in the memory 134 as instructions 138.

As shown in FIG. 1, the one or more memory devices 134 can also store data 136 that can be retrieved, manipulated, created, or stored by the one or more processors 132. The data 136 can include, for instance, mapping data, record data, supplemental data such as traffic data, price data, record cluster data, and other data. The data 136 can be stored in one or more databases. The one or more databases can be connected to the server computing system 130 by a high bandwidth LAN or WAN, or can also be connected to server computing system 130 through network 180. The one or more databases can be split up so that they are located in multiple locales.

Server computing system 130 can exchange data with one or more client devices such as user computing devices 102, 104, 106. User computing devices 102, 104, 106 are one example of a communication device. Although three client devices are illustrated in FIG. 1, any number of client devices can be connected to the server computing system 130 over the network 180. Each of the client devices can be any suitable type of computing device, such as a general purpose computer, special purpose computer, laptop, desktop, mobile device, navigation system, smartphone, tablet, wearable computing device, a display with one or more processors, or other suitable computing device.

Similar to the server computing system 130, a user computing device 102, 104, 106 can include one or more processor(s) 112 and a memory 114. The one or more processor(s) 112 can include one or more central processing units (CPUs), graphics processing units (GPUs) dedicated to efficiently rendering images or performing other specialized calculations, and/or other processing devices. The memory 114 can include one or more computer-readable media and can store information accessible by the one or more processors 112, including instructions 118 that can be executed by the one or more processors 112 and data 116. For instance, the memory 114 can store instructions 118 for implementing a digital mapping application 120 for displaying map data and other data determined according to example aspects of the present disclosure.

The user computing devices of FIG. 1 can include various input/output devices for providing and receiving information from a user, such as a touch screen, touch pad, data entry keys, speakers, and/or a microphone suitable for voice recognition. For instance, the user computing devices can have a display device for presenting a graphical user interface 122 displaying that data and other data within a map viewport 124 according to example aspects of the present disclosure.

The user computing devices can also include a network interface used to communicate with one or more remote computing devices (e.g. server computing system 130) over the network 180. The network interface can include any suitable components for interfacing with one more networks, including for example, transmitters, receivers, ports, controllers, antennas, or other suitable components.

The network 180 can be any type of communications network, such as a local area network (e.g. intranet), wide area network (e.g. Internet), cellular network, or some combination thereof. The network 180 can also include a direct connection between a user computing device 102, 104, 106 and the server computing system 130. In general, communication between the server computing system 130 and a user computing device 102, 104, 106 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

Server computing system 130 can host a geographic information system (GIS) 140. The GIS 140 can implement a mapping application, a virtual globe application, or any other suitable GIS. The GIS 140 can provide for the archiving, retrieving, and manipulation of geospatial data that has been indexed and stored according to geographic coordinates, such as latitude, longitude, and altitude coordinates, associated with the geospatial data. The GIS 140 can combine satellite imagery, photographs, maps, models, and other geographic data, and Internet search capability so as to enable a user to view imagery of the planet (e.g. map data associated with a plurality of geographic areas) and related geographic information (e.g., locales such as islands and cities, and points of interest such as local restaurants, hospitals, parks, hotels, and schools). The GIS 140 further allows a user to conduct local searches, to get travel directions to a location or between two locations, or to otherwise retrieve map data for a selected region. The user can virtually fly from space (e.g., some vantage point above the Earth) to and around an entered target address or location, such as a neighborhood or other area of interest. Results can be displayed in a two-dimensional or three-dimensional representation of the area of interest. In some the user can pan, tilt, and rotate the view to see three-dimensional terrain and buildings.

The GIS 140 can further allow a user to annotate maps, and/or enable data layers to show, for example, parks, schools, hospitals, airports, shopping, and other points of interest or locales. The GIS 140 can further allow the user to layer multiple searches, save results to folders, and share search results and maps with others. An example of a graphical user interface allowing the user to interact with the GIS 140 in accordance with example embodiments of the present disclosure is discussed with reference to FIG. 2, FIG. 3, and FIG. 4.

A user computing device 102 can include a digital mapping application 120 such as a geospatial browser or other suitable viewer that provides an interface between the user computing device 102 and the GIS 140. For instance, the digital mapping application can be configured to display digital map data within a map viewport 124 of a graphical user interface 122. A user of the user computing device 106 can interact with the digital mapping application 120 using graphical user interface 122 to facilitate interactions between the user computing device 102 and the GIS 140. The digital mapping application can provide a user interface for viewing geographic data (e.g. digital map data). The graphical user interface can include a plurality of user interface elements with which the user can interact to facilitate communications between the user computing device 102 and the GIS 140.

According to example aspects of the present disclosure, the digital mapping application 120 can be configured to display a map view of a geographic area including a selected region of a mapped region. As indicated, such map view can facilitate a more intuitive user experience for a user viewing the digital mapping application 120. In this manner, the user computing device 102 can communicate with the GIS 140 to facilitate a provision of the map view to the user.

The geographic information system 140 can include a map manager 142 and an off-viewport data manager 144. The off-viewport data manager 144 can be configured to determine supplemental data to display with a map associated with a geographic area such as a user selected region. For instance, the geographic area can be a geographic area to be displayed within a viewport of the digital mapping application 120 on the user computing device 102. In some implementations, the user can select the geographic area through an interaction with the digital mapping application 120. Such interaction can be any suitable interaction such as panning, zooming, etc. with respect to the digital mapping application such that the graphical user interface 122 is to display the geographic area, such as within map viewport 124. In some implementations, the geographic area can be displayed within the viewport in response to a search query provided by the user.

The off-viewport data manager 144 can access map data 146 and/or map element records 148 to determine supplemental data 154 to provide in response to one or more user requests for map data. For instance, map manager 142 can access map data 146 to determine map data to be displayed within the graphical user interface 122 in response to the one or more user requests. The one or more user request may be search queries or more simply, requests to modify a current map view in some manner. Based on the selected region, map manager 142 can access map data and provide the map data in response to the one or more user requests. Off-viewport data manager 144 may receive one or more search criteria associated with the one or more user requests to determine supplemental data 154 to provide in response to the one or more user requests. For example, off-viewport data manager 144 may compare one or more search terms with one or more index terms 152 associated with map element records 148. For example, off-viewport data manager 144 may determine whether one or more records 148 satisfy one or more search criteria based on whether the records are associated with index terms corresponding to the search criteria. In example embodiments, off-viewport data manager 144 can provide supplemental data based on one or more record locations 150 associated with locations outside of a selected region displayed within map viewport 124. Off-viewport data manager 144 may additionally use one or more location criteria to select records 148 and/or supplemental data 154 in response to user requests.

Supplemental data 154 may include various types of data related to map element records 148. Supplemental data may include data in addition to typical map data provided for records for a mapping system. By way of example, supplemental data 154 may include traffic condition data, price or availability data, or other types of data associated with one or more records. In some examples, supplemental data 154 may include metadata such as one or more rankings or scores, user reviews, location data, operating hours, menus, check-in data, and/or other suitable data associated with the respective records. Supplemental data may relate to any suitable building, structure, geographic area, energy, landmark, or other suitable location. Supplemental data can include data associated with graphical representations of the records to be rendered within map viewport 124. In some examples, supplemental data 154 may be generated in real-time based on a comparison of record data. For example supplemental data 154 may indicate one or more record clusters generated in real-time based on search criteria, location criteria, or other criteria.

The off-viewport data manager 144 can access map element records 148 to determine supplemental data to be displayed within map viewport 124 in association with map data for a selected region. The off-viewport data manager 144 can select the records to be displayed or the supplemental data to be provided in association with selected records, based at least in part on the map element records 148 and/or supplemental data 154.

In some examples, off-viewport data manager 144 may select supplemental data 154 to be displayed in map viewport 124 based at least in part on one or more location criteria to select one or more map element records 148 that that are associated with record locations 150 not located within the geographic area to be represented within the viewport. For instance, a location criterion can include a distance criteria on and/or direction criteria on in some examples. A record can be selected based on a corresponding record location that is located outside the geographic area, but within a threshold distance of the geographic area, for example.

In some examples, the off-viewport data manager 144 can identify data indicative of a plurality of candidate map element records 148 that are located within the threshold distance of the geographic area. For instance, the off-viewport data manager 144 may identify a plurality of map element records 148 that satisfy one or more search criteria and a location criterion of candidate records. Each of the plurality of records may be associated with a respective record location that is outside of the selected region displayed within map viewport 124. Off-viewport data manager 144 can select a subset of the plurality of record and/or supplemental data associated with the subset of records based on comparing the plurality of records. The comparison can be based on the supplemental data associated with the plurality of records in some examples. For example a subset of records may be selected based on traffic condition data, or metadata such as pricing or other information associated with the record location.

The geographic information system 140 can provide map data 146 and/or record data including map element records 148 and/or supplemental data 154 to be displayed within the map viewport 124 of the user computing device 102. The digital mapping application 120 can then render the map data and/or the record data within the viewport 124 of the graphical user interface 122. In particular, the digital mapping application 120 can render the map data in the map viewport 124 simultaneously with record data selected based on search criteria, location criteria, and a comparison of the plurality of records matching the same.

By way of example, supplemental data 154 may include weather information, traffic information, transportation information, or other suitable information associated with a geographic area. The supplemental data can be represented graphically within the map viewport 124. For instance, one or more weather elements (e.g. graphical representations of weather events, such as rain, snow, sunshine, moonlight, etc.) can be determined based at least in part on a current real-time environmental information associated with the geographic area in the physical world. In this manner the geographic information system 140 can obtain environmental information currently associated with the geographic area. Such environmental information can be obtained from any suitable source.

Figure 2:
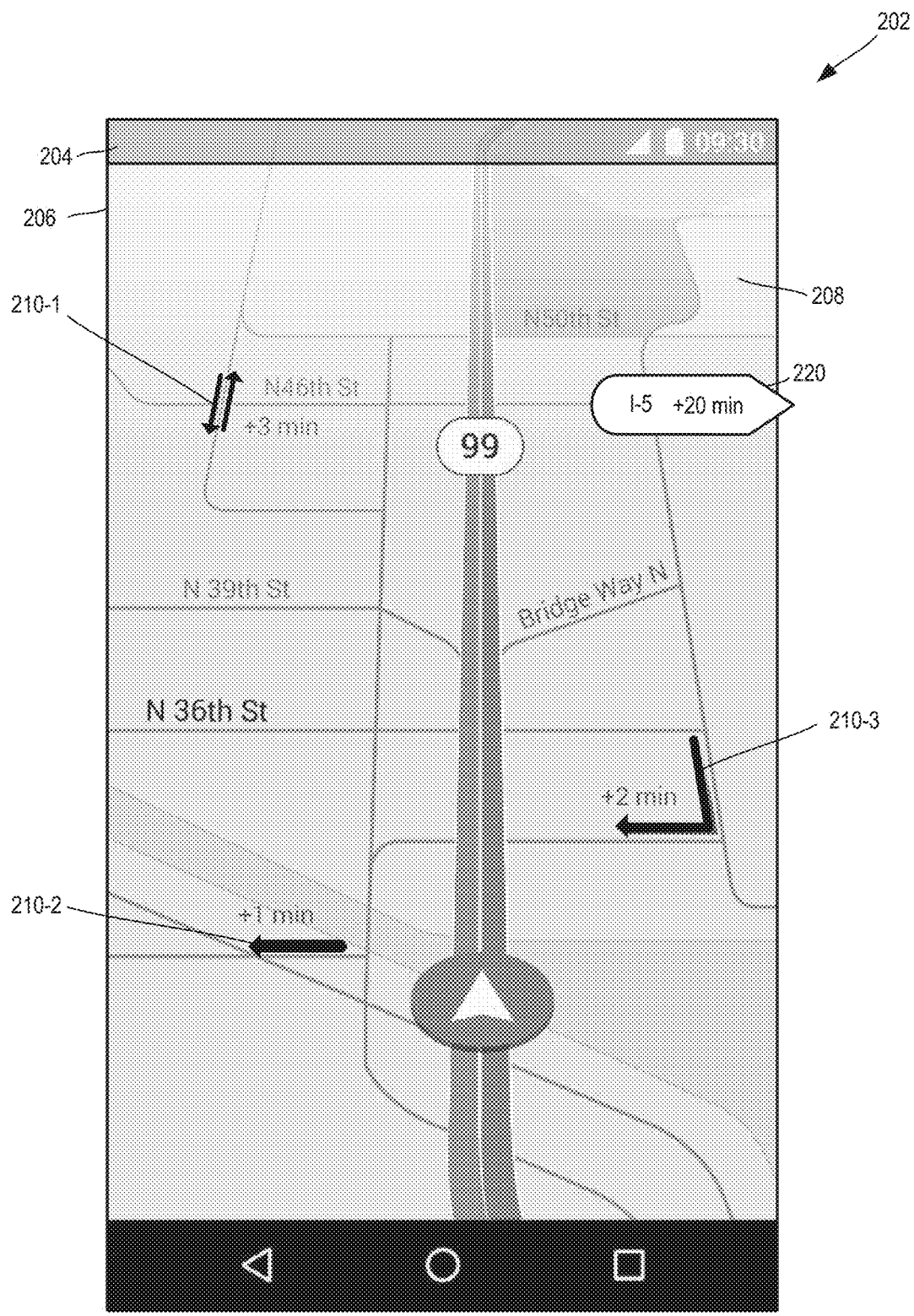
FIG. 2 is a block diagram of a computing system including a graphical user interface depicting a representation of map data for a selected region and a visual indication of a traffic condition a location outside of the selected region.

FIG. 2 is a block diagram depicting an example of a user computing device 202, having a screen on which is displayed map data 208 that has been rendered in a visual format. The map data can be displayed in a map viewport 206 of a graphical user interface of a digital mapping application in accordance with example embodiments of the present disclosure. In the particularly described example, the screen of user computing device 202 further includes a secondary user interface two four that depicts secondary information such as battery usage, time, network connection associated with the user computing device 202.

The rendered map data 208 includes a map topology depicting a street-level view of a geographic area including a plurality roads and other map elements including a waterway and a park in the particularly described example. The map viewport 206 additionally presents a plurality of visual indications 210-1, 210-2, and 210-3 depicting traffic conditions at three respective traffic condition locations within the selected region depicted in the map viewport 206. For instance, visual indication 210-1 depicts a traffic condition at a respective traffic condition location that is associated with a time delay of three minutes. Accordingly, visual indication 210-1 includes a visual indication of the time delay. In this example, visual indication 210-1 indicates that the time delay is currently experienced by traffic traveling in two directions at the respective traffic condition location. Similarly, visual indication 210-2 includes a visual indication of a time delay (e.g., +1 min) indicating a time delay currently experienced by traffic traveling in one direction at another respective traffic condition location. Visual indication 210-3 includes a visual indication of the time delay value (e.g., +2 min) indicating a time delay currently experienced by traffic traveling in one direction at another respective traffic condition location.

Map viewport 206 can further display traffic conditions associated with one or more traffic condition locations that are outside of the selected region corresponding to the rendered map data 208 currently displayed in the viewport. For instance, map viewport 206 can present a visual indication 220 of a traffic condition at a location outside of the selected region corresponding to rendered map data 208. In this example, visual indication 220 includes an indication of the corresponding traffic condition location that is outside of the selected region. For instance, visual indication 220 indicates that the corresponding traffic condition is being experienced at a traffic condition location denoted "I-5." Additionally, visual indication 220 includes an indication of the time delay (+20 min) currently experienced by traffic at the traffic condition location. Moreover, visual indication 220 includes an indication of a direction of the traffic condition location relative to a point within the selected region displayed within viewport 206. For instance, visual indication 220 includes an arrow indicating that the corresponding traffic condition location is to the right with respect to the current depiction of the rendered map data 208. Although map viewport 206 depicts a single visual indication 220 corresponding to an off-viewport record location, other examples may detect additional visual indications of additional traffic condition locations.

Figure 3:
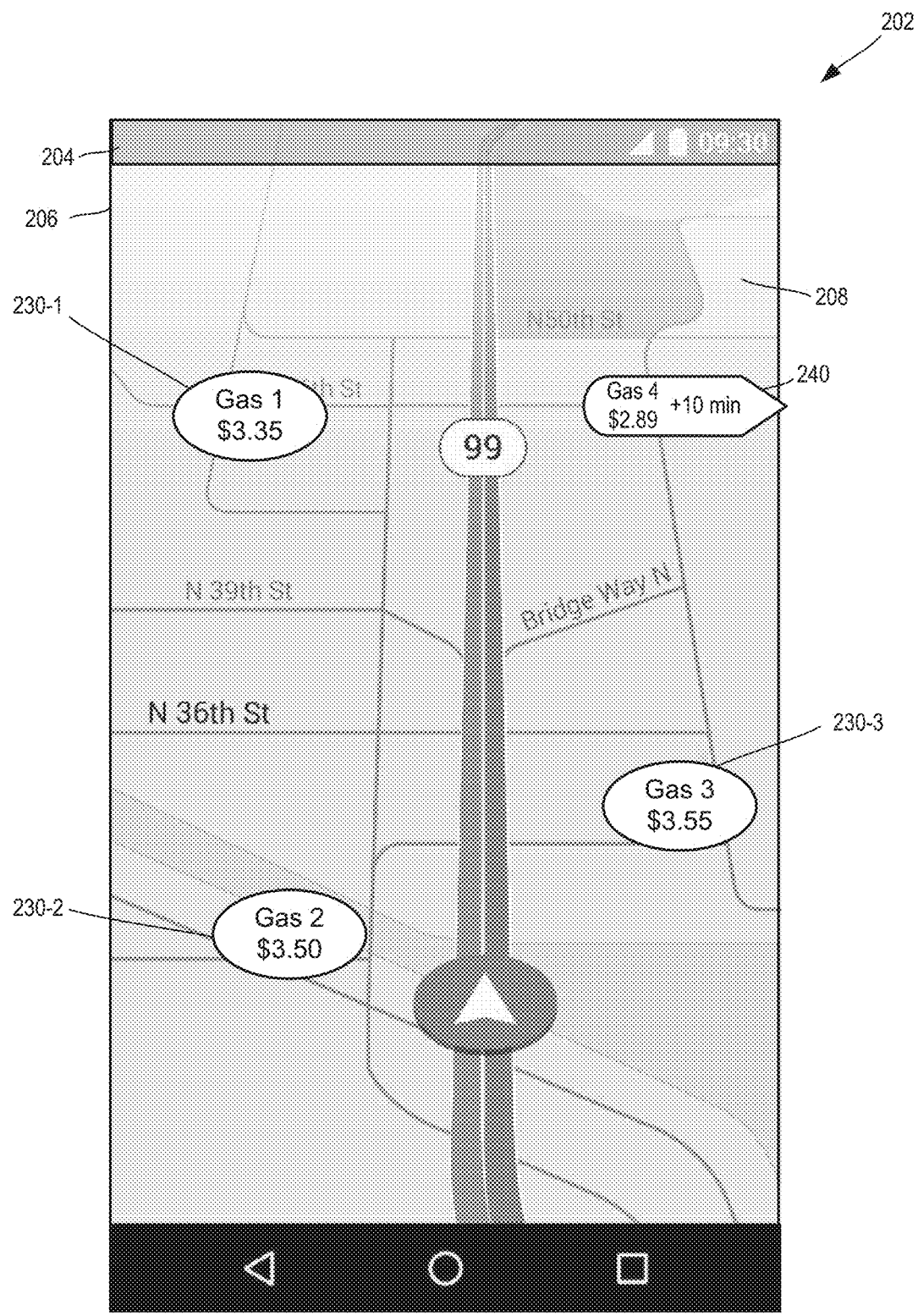
FIG. 3 is a block diagram of a computing system including a graphical user interface depicting a representation of map data for a selected region and a visual indication of price data associated with a location outside of the selected region.

FIG. 3 is a block diagram depicting another example of user computing device 202, having a screen that is again displaying rendered map data 208. In this example, map viewport 206 presents visual indications 230-1, 230-2, and 230-3 that depict supplemental data associated with three record locations within the selected region. The supplemental data may be selected in response to one or more search criteria, such as a user request for gas pricing information in the selected region. In response to the one or more user requests, map viewport 206 provides visual indication 230-1 depicting a gas price at a first record location, provides visual indication 230-2 depicting a gas price of a second record location, and provides visual indication 230-3 depicting a gas price at a third record location.

Map viewport 206 additionally displays supplemental data indicating a gas price associated with one or more record locations (e.g., gas station location) that are outside of the selected region corresponding to the rendered map data 208 currently displayed in the viewport. For instance, map viewport 206 can present a visual indication 240 of a gas price at a location outside of the selected region corresponding to rendered map data 208. In this example, visual indication 240 includes an indication of the corresponding record location that is outside of the selected region. For instance, visual indication 240 indicates that the corresponding record location is identified as "Gas 4." Additionally, visual indication 240 includes supplemental data which in this case indicates a price of gasoline (e.g., $2.89) at the corresponding record location. Additionally, visual indication 220 includes an indication of an expected time to travel between a point in the selected region to the record location. Moreover, visual indication 240 includes an indication of a direction of the record location relative to a point within the selected region. For instance, visual indication 240 includes an arrow indicating that the corresponding record location is to the right with respect to the current depiction of the rendered map data 208. Although map viewport 206 depicts a single visual indication 240 corresponding to an off-viewport record location, other examples may depict additional visual indications of additional traffic condition locations.

In some examples, the geographical information system may determine a subset of records for which to provide supplemental data based on comparing the records. For instance, in this example the geographical information system may compare the price of gasoline of the plurality of records corresponding to record locations outside of the selected region in order to select one or more records having a lowest or lower price. In some examples, the comparison may be amongst record locations outside of the selected region only. In other examples, the comparison may be amongst record locations outside of the selected region as well as record locations within the selected region. By way of example, the geographic information system in this example may determine to present the supplemental data associated with the location "Gas 4" based on the supplemental data indicating that the location has the lowest price for gasoline within the selected region, and/or outside of the selected region but within a threshold criterion.

Figure 4:
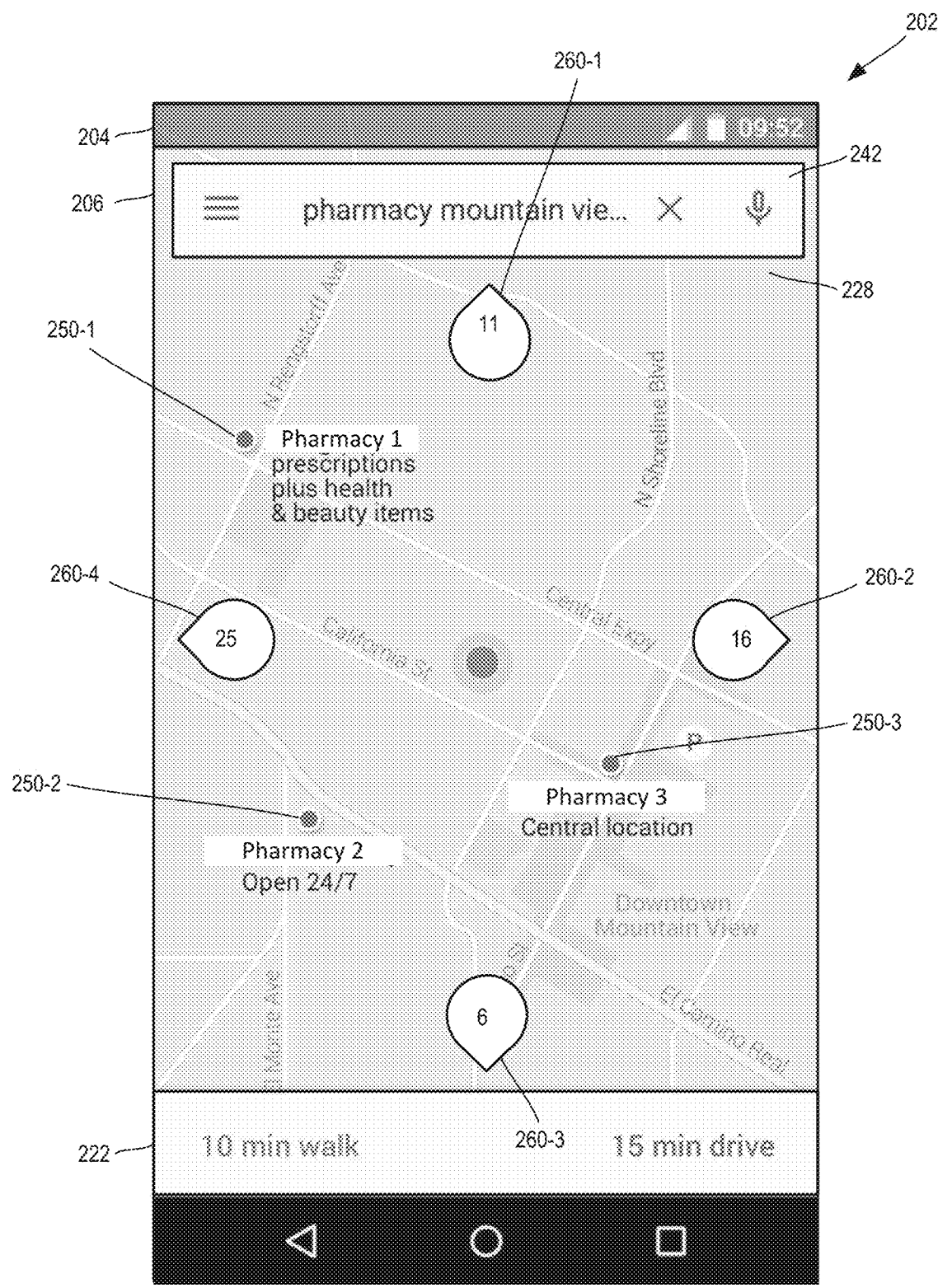
FIG. 4 is a block diagram of a computing system including a graphical user interface depicting a representation of map data for a selected region and a visual indication of a record cluster associated with one or more locations outside of the selected region.

FIG. 4 is a block diagram depicting yet another example of user computing device 202. In this example, computing device 202 includes a screen displaying rendered map data 228 within map viewport 206. The screen of device 202 further depicts secondary user interface 204, as well as a direction interface 222 of a graphical user interface of the digital mapping application, which can provide directions for a trajectory between two or more locations. Map viewport 206 displays a search box 242 in which a user may provide one or more search criteria such as search terms. In the particularly described example, a user has entered one or more search criteria and the map viewport 206 has responded with a display including visual indications 250-1, 250-2, and 250-3 indicating records having corresponding record locations that are within the selected region.

Map viewport 206 can further display visual indications of record clusters that each include two or more records having corresponding record locations outside of the selected region. For example, the geographic information system may identify a plurality of records that satisfy one or more search criteria and one or more location criteria. A location criterion may include a distance criterion and/or a direction criterion. A distance criterion may specify that for a record to be selected, a corresponding record location should be within a specified distance of the selected region or a point within the selected region. Additionally a distance criterion may specify that records selected for a record cluster should be within a specified distance of one another. A direction criterion may specify that for a record to be included within a record cluster it should be within a specified angle range about a central point of the selected region. The respective angular ranges of the record clusters may be non-overlapping, and/or may collectively span all angles about the central point of the selected region, similarly, angular ranges may be predetermined or variable variable (e.g. user-selected, or dependent upon the number and/or record locations of the identified records). The angular ranges may be equal to each other (e.g. in the case of four clusters, each may be 90 degrees about the central point of the selected region).

The number of record clusters may be predefined, or depend upon identified records (e.g. the number of identified records and/or their associated record locations). Similarly, the number of records in a record cluster may be predefined, or depend upon identified records.

A given record cluster may be associated with a number of records in the cluster, a direction relative to the selected region, or other information. That direction may, for example, be a direction which is within the associated angular range about the central point of the selected region. For example, it may be center of the angular range. Alternatively, the direction may be derived based on the record locations associated with the records of the record cluster, e.g. as the direction from a center point of the selected region towards an average of those record locations.

In the particularly described example, map viewport 206 presents visual indications 260-1, 260-2, 260-3, and 260-4 of respective record clusters. Visual indication 260-1 indicates that the corresponding record cluster includes eleven records. Additionally, visual indication 260-1 indicates a direction of the corresponding record cluster relative to a point within the selected region. For instance, visual indication 260-1 includes an arrow or point indicating that the record cluster corresponds to record locations outside of the selected region that are to the top or north of the selected region relative to the depiction in FIG. 4. Visual indication 260-2 indicates that the corresponding record cluster includes sixteen records with corresponding record locations to the right or east of a selected point within the selected region. Visual indication 260-3 indicates that the corresponding record cluster includes six records having corresponding record locations to the bottom or South of a selected point within the selected region. Visual indication 260-4 indicates that a corresponding record cluster includes twenty-five records having corresponding record locations to the left of or west of a selected point within the selected region.

Figure 5:
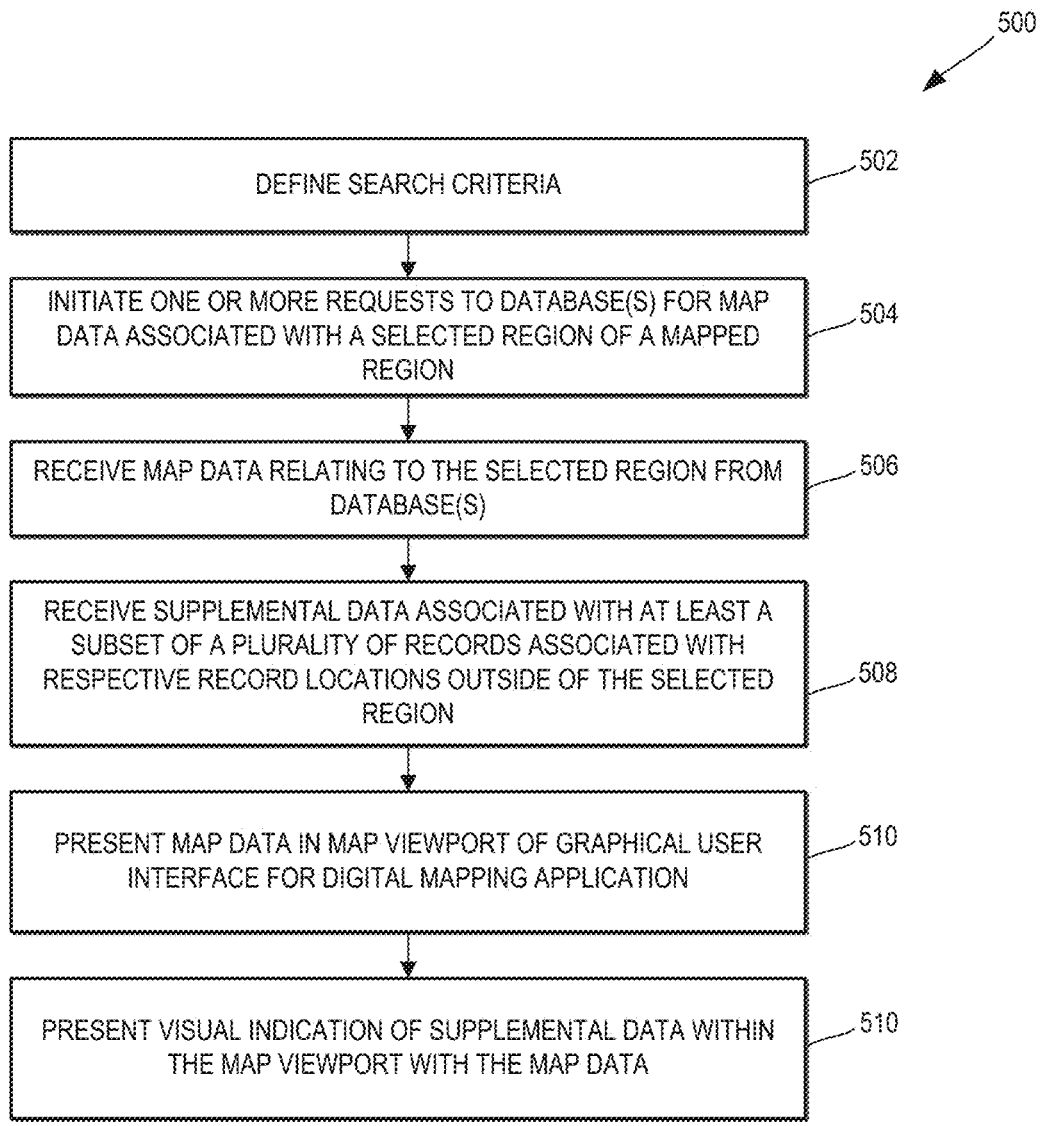
FIG. 5 is a flowchart depicting an example method for presenting map data in a map viewport along with a visual indication of one or more locations outside of a selected region associated with the map data.

FIG. 5 is a flowchart depicting an example method 500 for presenting visual indications of supplemental data associated with one or more locations outside of a selected region while presenting map data for the selected region. One or more portions of method 500 can be implemented by one or more computing devices such as, for example, a user computing device 102, 104, 106, as depicted in FIG. 1 or user computing device 202 as depicted in FIG. 2. One or more portions of the method 500 described herein can be implemented as an algorithm on the hardware components of the devices described herein (e.g., as in FIG. 1) to, for example, generate a graphical user interface including a map viewport image map data for a selected region is rendered along with supplemental data associated with one or more records. In example embodiments, process 600 may be performed by a digital mapping application 120 of user computing device 102.

At (502), one or more search criteria can be defined, for example, in response to user input. By way of example, the one or more search criteria may include one or more search terms provided by user or otherwise generated in response to user input. In some examples, one or more search criteria can be generated in response to a user selected location. Additionally, a user selected scale may be used to generate one or more search criteria. It is noted however, that the one or more search criteria may be automatically generated. For instance, one or more search criteria may be generated automatically, in order to request a portion of a mapped region which is centered on a location specified by the digital mapping application. In this manner, it is noted that the search criteria may be general requests for map data associated with the selected region of a mapped region. Additionally, the search criteria may be more specific requests including one or more search terms or other input search queries.

At (504), one or more requests are initiated to one or more databases for map data associated with the selected region of a mapped region. The one or more requests may include one or more search criteria in some examples. More particularly, a user computing device may initiate one or more requests by transmitting a search instruction out of the user computing device. The search request may specify the one or more search criteria. With reference to FIG. 1, a user computing device 102, 104, or 106 may initiate one or more requests to one or more databases of geographic information system 140, such as one or more databases containing map data 146 and/or map element records 148.

At (506), map data relating to the selected region is received from the one or more databases. The map data may be received as one or more responses from geographic information system 140 provided in reply to the one or more requests.

At (508), supplemental data associated with at least a subset of a plurality of records outside of the selected region is received. The supplemental data can be related to the search criteria. The plurality of records may directly or indirectly relate to the search criteria. For example, the plurality of records may include records outside of a selected region being searched. In some examples, the plurality of records is identified based on satisfying the search criteria as well as one or more location criteria. The one or more location criteria may specify records that are outside of the selected region but within a threshold distance or other parameter of the selected region. A subset of records can be selected from the plurality of records based on a comparison of the plurality of records in some examples. For example, supplemental data or other information associated with the plurality of records may be used to select a subset. The supplemental data may include various information associated with the subset of records. By way of example, the supplemental data may include traffic condition data, third-party data, metadata, or other information not directly pertaining to the mapping of a particular location.

At (510), the map data received at (506) can be presented in a map viewport of a graphical user interface for a digital mapping application. For example, the map data may be rendered as a visual display within a map viewport 124 of digital mapping application 120 depicted in FIG. 1.

At (512), one or more visual indications of the supplemental data received at (508) can be presented in the map viewport along with the map data for the selected region. As earlier described, a linear mapping can be defined between the real-world points of the selected region, and the points within the map viewport. Elements of the map data can be displayed on the screen at respective points defined by the mapping. The map data of the selected region can be displayed according to a continuous mapping between points of a display area (e.g., viewport) of a screen and real-world locations. Moreover, the one or more visual indications of the supplemental data can be simultaneously displayed within the same display area. The supplemental data can correspond to real-world positions which are outside of the selected region. In this manner, the graphical user interface can simultaneously display in a single display area map data for a selected region, as well as visual indications associated with locations that are not concurrently displayed by the user computing device.

Although FIG. 5 depicts steps performed in a particular order for purposes of illustration and discussion, the methods of the present disclosure are not limited to the particularly illustrated order or arrangement. The various steps of method 500 (and methods 550, 600, 650, 700, and 750 described hereinafter) can be omitted, rearranged, combined, and/or adapted in various ways without deviating from the scope of the present disclosure.

Figure 6:
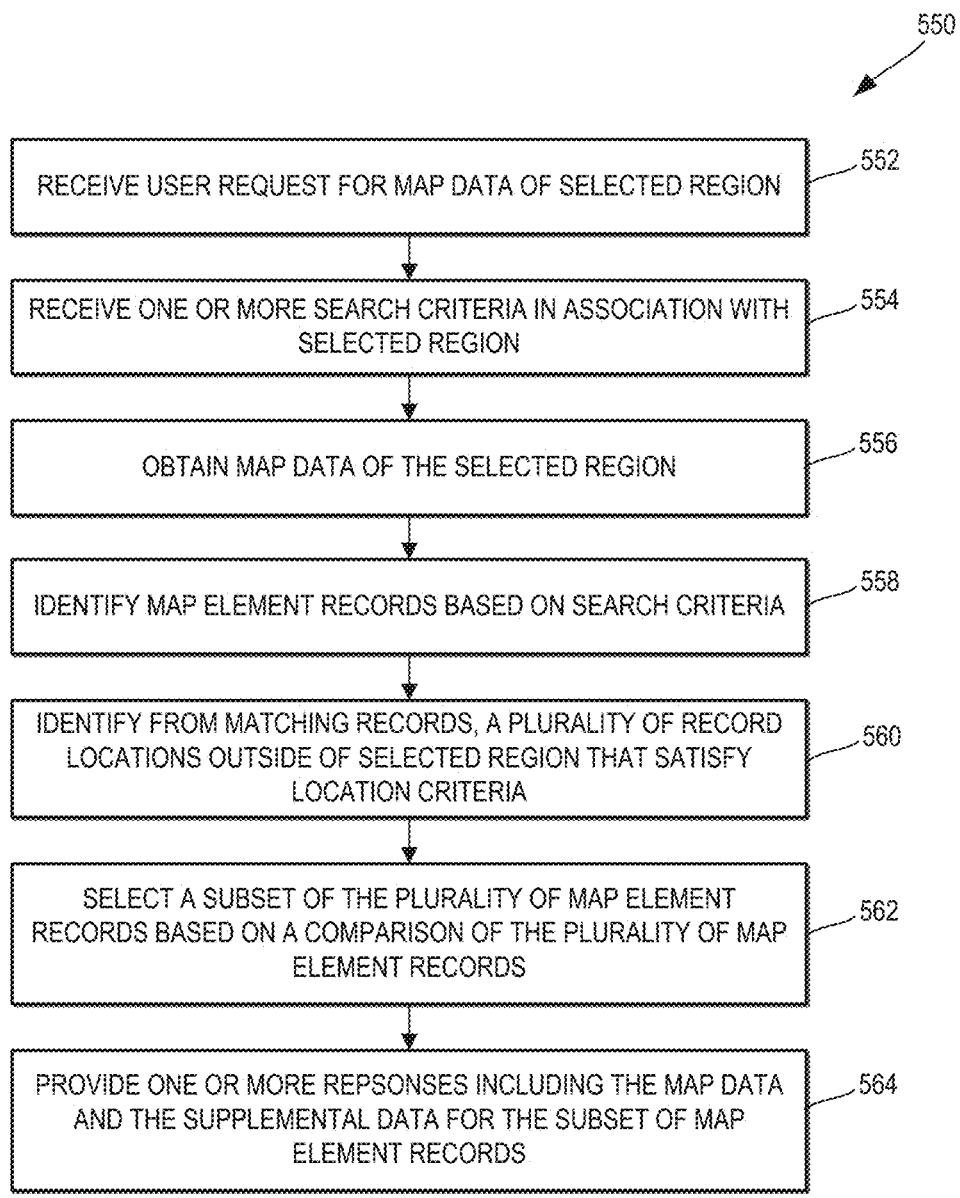
FIG. 6 is a flowchart depicting an example method for providing, in response to one or more user requests, map data for a selected region and supplemental data for one or more locations outside of the selected region.

FIG. 6 is a flowchart depicting an example method 550 for responding to user requests for map data associated with the selected region. One or more portions of method 550 can be implemented by one or more computing devices such as, for example, a server computing system 130, as depicted in FIG. 1. Moreover, one or more portions of method 550 described herein can be implemented as an algorithm on the hardware components of the devices described herein (e.g., as in FIG. 1) to, for example, respond to user requests associate with the selected region by providing map data for the selected region as well as supplemental data from one or more locations outside of the selected region. In example embodiments, method 550 may be performed by a geographic information system 140 of server computing system 130.

At (552), one or more user requests for map data associated with a selected region are received. At (554), one or more search criteria are received in association with the selected region. The one or more user requests may be initiated in response to direct user input in some examples. In other examples, one or more user requests may be automatically generated, such as in response to an application centering a mapped region. By way of example, user requests may include general requests for map data such as may be received in response to a user scrolling within a map rendering, or more specific requests associated with one or more specific search criteria. In this manner, one or more search criteria may include one or more search terms or may be more generalized criteria for map data associated with the selected region.

At (556), map data of the selected region is obtained. For example, map manager 142 may obtain map data of the selected region from a database for map data 146.

At (558), one or more map element records that are associated with the one or more search criteria are identified. For example, map element records 148 may be associated with one or more index terms 152. At (558), map element records for which the respective index terms match the one or more search criteria can be identified.

At (560), a plurality of record locations outside of the selected region are identified from the matching records based on a location criterion. For example, record locations that match the search criteria and that are outside of the selected region, but within a threshold or specified distance of the selected region can be identified at (560). Other location criteria can be used. For example, the subset of records can be selected based on a being within a specified distance of the selected region, and/or within a specified distance of a specific point in the selected region, and/or within a specified distance from each other. In some examples, the order of (558) and (560) can be reversed.

At (562), at least a subset of the plurality of map element records are selected. In some examples the subset is selected based on a comparison of the plurality of map element records. For instance, the subset can be selected by applying one or more comparison criteria. The comparison criteria may be applied in addition to search criteria and location criteria. For example, the comparison criteria may be applied to supplemental data associated with the plurality of map element records in order to select the subset. By way of example, supplemental data may include traffic condition data. The comparison criteria may specify a minimum time delay or other parameter for selecting a traffic condition record corresponding to a location outside of the selected region. In another example, the comparison criteria may specify the selection of a predetermined or dynamic number of map element records from the plurality. For instance, the comparison criteria may be applied to select a percentage of the plurality of map element records based on the supplemental data. As a particular example, the comparison criteria may specify selecting half or another percentage of the records having a lowest price or a longest time delay, etc.

At (564), one or more responses can be provided from the geographic information system that includes map data and the supplemental data associated with the subset of map element records. In some implementations, a first response may include the map data and a second response may include the supplemental data. In other examples a single response may include both the map data and the supplemental data.

Figure 7:
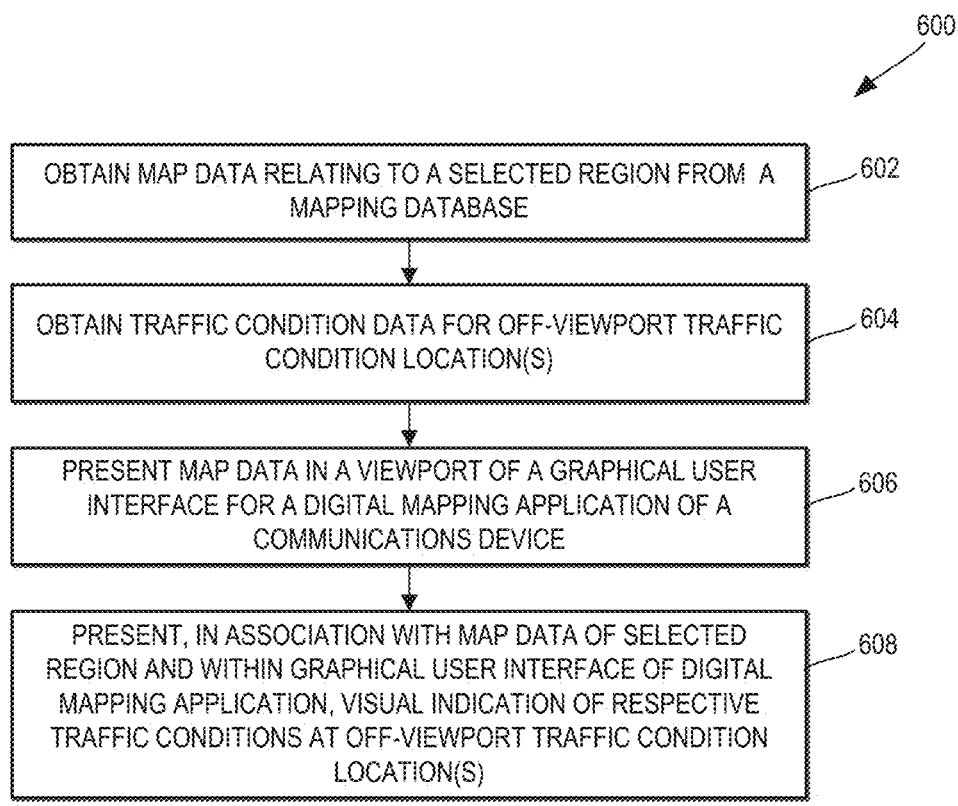
FIG. 7 is a flowchart depicting an example method for presenting in a graphical user interface map data for a selected region along with a visual indication of traffic conditions at one or more locations outside of the selected region.

FIG. 7 is a flowchart depicting an example method 600 for presenting traffic condition data associated with one or more traffic condition locations outside of the selected region currently displayed within a map viewport. One or more portions of method 600 can be implemented by one or more computing devices such as, for example, a user computing device 102, 104, or 106 as depicted in FIG. 1, or user computer device 202 depicted in FIG. 2. Moreover, one or more portions of method 600 described herein can be implemented as an algorithm on the hardware components of the devices described herein (e.g., as in FIG. 1) to, for example, present map data and traffic condition data within a map viewport. In example embodiments, method 600 may be performed by a digital mapping application 120 of user computing device 102.

At (602), map data relating to the selected region is obtained from a mapping database. For example, a user computing device 102 such as a communication device may obtain map data from a mapping database associated with a geographic information system.

At (604), traffic condition data for one or more off-viewport traffic condition locations can be obtained. The off-viewport traffic condition locations can correspond to locations outside of the selected region currently displayed within the map viewport.

At (606), the map data obtained at (602) can be presented in the viewport of the graphical user interface for the digital mapping application of the user computing device. As earlier described, the map data may be displayed using a continuous mapping such that each point within the map viewport corresponds to a respective location in the selected region.

At (608), a visual indication of respective traffic conditions at the off-viewport traffic condition locations are presented within the graphical user interface of the digital mapping application. Each visual indication is indicative of the respective current traffic conditions at the corresponding traffic condition location. Each visual indication is presented at a location within the graphical user interface which is different from the traffic condition location of the mapped region under a continuous mapping. The location within the graphical user interface may not directly correspond to the traffic condition location of the mapped region. In some examples, at least one of the visual indications is presented within the same display area as the map data for the selected region. For example, at least one of the visual indications can be presented within the map viewport along with the map data.

Figure 8:
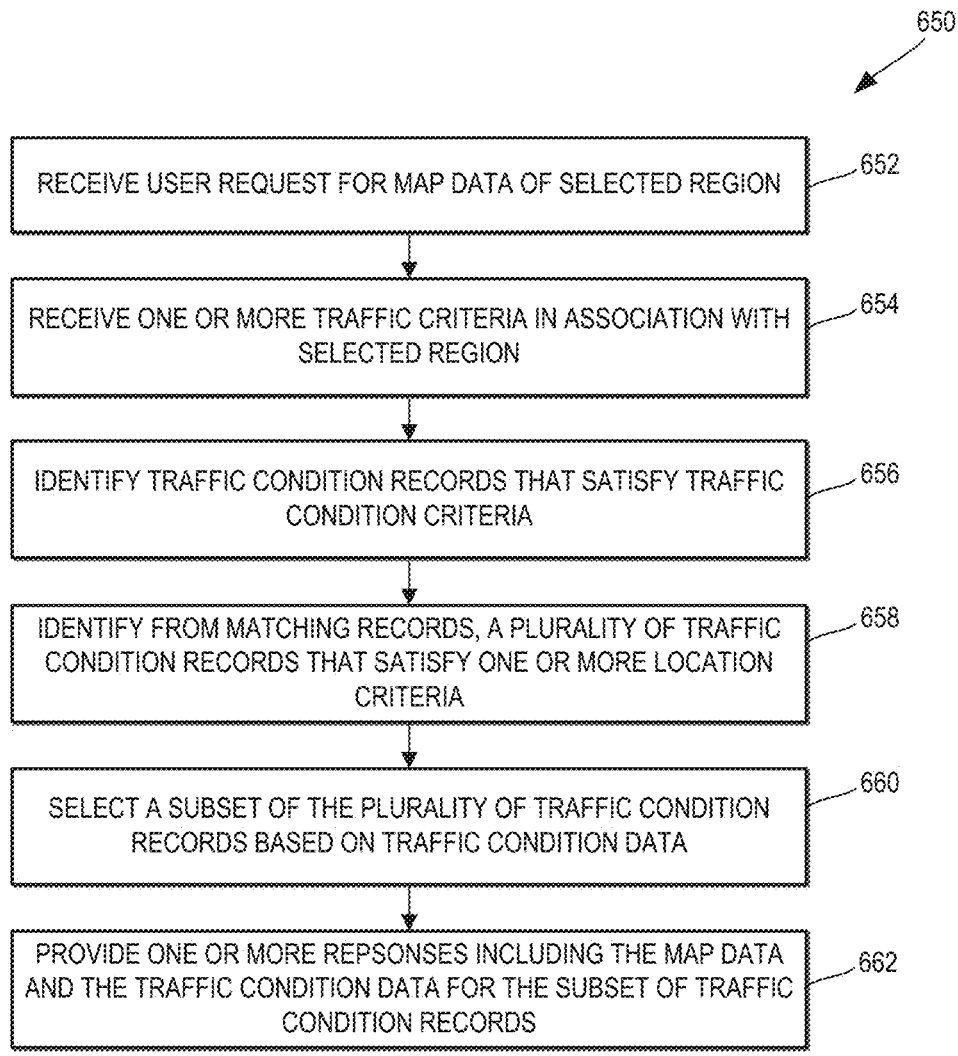
FIG. 8 is a flowchart depicting an example method for providing, in response to one or more user requests, map data for a selected region and traffic condition data for one or more locations outside of the selected region.

FIG. 8 is a flowchart depicting an example method 650 for providing responses to user requests for map data of the selected region, including traffic condition data for one or more off-viewport traffic condition locations. One or more portions of method 650 can be implemented by one or more computing devices such as, for example, a server computing system 130 as depicted in FIG. 1. Moreover, one or more portions of the methods 650 described herein can be implemented as an algorithm on the hardware components of the devices described herein (e.g., as in FIG. 1) to, for example, obtain and provide traffic condition data in response to requests for map data associated with a selected region. In example embodiments, method 650 may be performed by a geographic information system 140.

At (652), a user request is received for map data associated with a selected region. At (654), one or more traffic condition criteria are received in association with the selected region. In some examples, the traffic condition criteria can be a specific request for traffic information at a selected region. In other examples, the traffic criteria can be general request for traffic information. For example, a request including traffic criteria may be issued in response to a user scrolling within a display presenting map data with existing traffic information. In other examples, a user may enter one or more search terms or other search criteria for specific traffic condition information or specific types of traffic condition information.

At (656), one or more traffic records are identified that match or otherwise satisfy the one or more traffic criteria. For example, the geographic information system may select traffic records that are outside of the selected region currently displayed in a map viewport. At (658), a plurality of traffic records are identified from the matching records determined at (656). The plurality of traffic records are identified based on one or more location criteria. For example, traffic record locations that match the traffic criteria and that are outside of the selected region, but within a threshold or specified distance of the selected region can be identified at (658). Other location criteria can be used. For example, the subset of records can the selected based on being within a specified distance of the selected region, and/or within a specified distance of a specific point in the selected region, and/or within a specified distance from each other. In some examples, the order of (656) and (658) can be reversed.

At (660), a subset of the plurality of traffic records can be selected based on a comparison of the traffic conditions at each respective traffic record locations. For instance, the subset can be selected by applying one or more comparison criteria. By way of example, a predetermined number or percentage of traffic records can be selected that are associated with longer time delays and other traffic records. Other comparison criteria may be used. In some examples all of the traffic records may be selected at (660).

At (662), one or more responses are provided from the geographic information system to a user computing device. The one or more responses include the map data for the selected region and the traffic condition data for the subset of traffic records.

Figure 9:
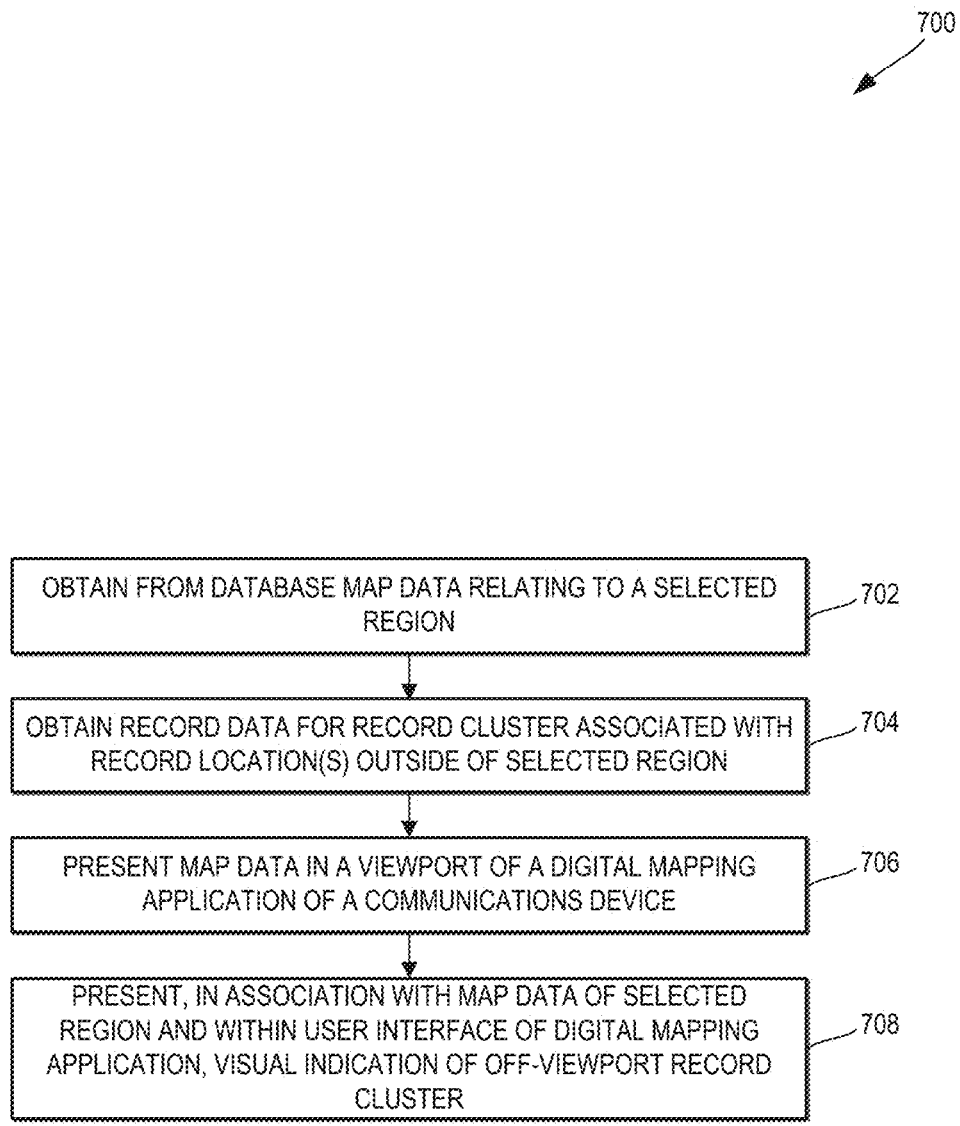
FIG. 9 is a flowchart depicting an example method for presenting in a graphical user interface map data for a selected region along with a visual indication of a record cluster associated with one or more locations outside of the selected region.

FIG. 9 is a flowchart depicting an example method 700 for presenting information relating to a record cluster associated with one or more locations outside of the selected region currently displayed within a map viewport. One or more portions of method 700 can be implemented by one or more computing devices such as, for example, a user computing device 102, 104, or 106 as depicted in FIG. 1, or user computer device 202 depicted in FIG. 2. Moreover, one or more portions of the processes described herein can be implemented as an algorithm on the hardware components of the devices described herein (e.g., as in FIG. 1) to, for example, present map data associated with the record cluster within a map viewport of the digital mapping application. In example embodiments, method 700 may be performed by a digital mapping application 120 of user computing device 102.

At (702), map data relating to a selected region is obtained from a mapping database. For example, the user computing device 102 may obtain map data from a mapping database associated with a geographic information system.

At (704), record data for a record cluster associated with one or more record locations outside of the selected region are obtained. In some examples, the record data can be supplemental data associated with the record cluster. The record data may include a number of records or record locations associated with the record cluster. Additionally, record data may identify a location or direction of the record cluster relative to a selected point in the selected region.

At (706), the map data obtained at (702) can be presented in the viewport of the graphical user interface for the digital mapping application of the user computing device. As earlier described, the map data may be displayed using a continuous mapping such that each point within the map viewport corresponds to a respective location in the selected region.

At (708), one or more visual indications associated with the record cluster are presented within the graphical user interface of the digital mapping application. The visual indication is indicative of the respective record cluster. The visual indication is presented at a location within the graphical user interface which is different from or otherwise does not correspond to the respective location of any of the corresponding records of the record cluster under a continuous mapping. In some examples, the visual indication can be presented within the same display area as the map data for the selected region. For example, the visual indication can be presented within the map viewport along with the map data.

Figure 10:
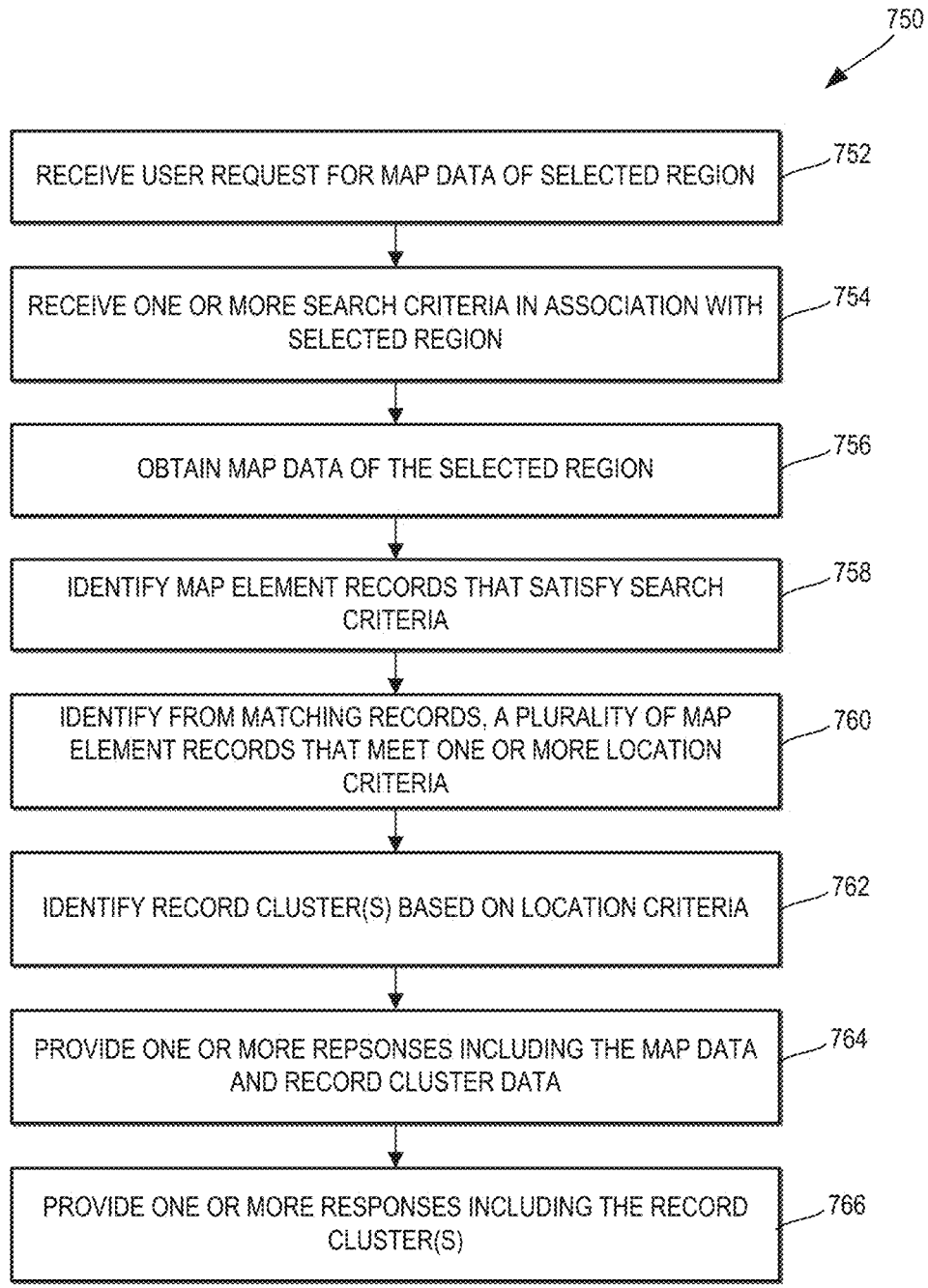
FIG. 10 is a flowchart depicting an example method for providing, in response to one or more user requests, map data for a selected region and record cluster data for one or more locations outside of the selected region.

FIG. 10 is a flowchart depicting an example method 750 for providing responses to user requests for map data of a selected region, including record cluster data associated with a plurality of off-viewport record locations. One or more portions of method 750 can be implemented by one or more computing devices such as, for example, a server computing system 130 as depicted in FIG. 1. Moreover, one or more portions of the processes described herein can be implemented as an algorithm on the hardware components of the devices described herein (e.g., as in FIG. 1) to, for example, obtain and provide record cluster data in response to requests for map data associated with a selected region. In example embodiments, method 750 may be performed by a geographic information system 140.

At (752), a user request is received for map data associated with a selected region. At (754), one or more search criteria are received in association with the selected region. At (756), map data for the selected region associated with the one or more user requests is obtained.

At (758), map element records are identified that match or otherwise satisfy the one or more search criteria. At (760), a plurality of map element records are identified from the matching records determined at (758) based on one or more location criteria. In some examples, the one or more location criteria may specify the selection of matching records that are outside of the selected region, but within a threshold or specified distance of the selected region can be identified at (760).

At (762), one or more record clusters or identified based on one or more location criteria. For example, a location criterion may comprise at least one distance criterion and/or at least one direction criteria. The distance criterion may specify that identified records for a record cluster are those associated with respective record locations that are outside of the selected region but which are within a specified distance from the selected region. Other distance criterion such as a being within a specified distance from a specific point in the selected region and/or within a specified distance from each other may be used. The direction criterion for a given record cluster may specify that the identified records of the record cluster the within a specified angular range about a central point of the selected region. The respective angular ranges of the record clusters may be non-overlapping, and/or may collectively span all angles about the central point of the selected region. Similarly, the angular range(s) may be predetermined or variable (e.g. user-selected, or dependent upon the number and/or record locations of the identified records). The angular ranges may be equal to each other (e.g. in the case of four clusters, each may be 90 degrees about the central point of the selected region).

At (764), one or more responses are provided from the geographic information system to a user computing device. The one or more responses include the map data for the selected region and the record cluster data for the record clusters.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computing system for providing map information, comprising:
   one or more processors; and
   one or more tangible, non-transitory, computer readable media that store instructions that when executed by the one or more processors cause the computing system to perform operations, the operations comprising:
     initiating one or more requests to one or more databases for map data associated with a selected region of a mapped region, the one or more requests are associated with one or more search criteria;
     receiving, in response to the one or more requests, the map data associated with the selected region and supplemental data associated with at least a subset of a plurality of records, wherein each of the plurality of records is associated with the one or more search criteria and a respective record location outside of the selected region;
     presenting, within a viewport of a digital mapping application, the map data of the selected region, each point of the viewport corresponding to a respective point of the selected region; and
     presenting within the viewport with the map data, at least one visual indication of the supplemental data associated with a record cluster, the visual indication including a representation of a number of records in the record cluster and a direction of the record cluster relative to the presented map data.

2. The computing system of claim 1, wherein:
   the respective record location of each of the subset of records is a respective traffic condition location;
   the one or more search criteria include one or more traffic condition criteria;
   the supplemental data is traffic condition data describing a corresponding current traffic condition at the respective traffic condition location of each of the subset of records;
   the subset of the plurality of records is selected based on a comparison of the traffic condition data; and
   the at least one visual indication includes an indication of the corresponding current traffic condition at the respective traffic condition location of each of the subset of records.

3. The computing system of claim 2, wherein:
   the corresponding current traffic condition of each of the subset of records comprises a time delay value indicative of a time delay currently experienced by traffic travelling at the respective traffic condition location; and
   each visual indication indicates the time delay value at the respective traffic condition location.

4. The computing system of claim 1, wherein:
   the at least one visual indication of the supplemental data associated with the subset of records is provided for display at a location of the viewport that does not correspond to the respective record locations of the subset of records.

5. The computing system of claim 1, wherein:
   the at least one visual indication indicates that the respective record location of each of the subset of records is located outside of the selected region within the viewport.

6. The computing system of claim 1, wherein:
   the at least one visual indication indicates a direction, relative to a point within the selected region, of the respective record location of each of the subset of records.

7. The computing system of claim 1, wherein:
   the at least one visual indication indicates a distance from a point of the selected region to the respective record location.

8. The computing system of claim 1, wherein:
   the one or more databases include map data describing transport routes in the mapped region; and
   the selected region is a portion of the mapped region.

9. A computing system for providing map information, comprising:
   one or more processors; and
   one or more tangible, non-transitory, computer readable media that store instructions that when executed by the one or more processors cause the computing system to perform operations, the operations comprising:
     receiving, by the computing system, one or more requests associated with map data of a selected region;
     obtaining, in response to the one or more requests, the map data associated with the selected region;
     identifying, in response to the one or more requests, a plurality of records based at least in part on the one or more search criteria and a location criterion, each of the plurality of records being associated with a respective record location that is outside of the selected region, the plurality of records being associated with a record cluster;
     selecting a subset of the plurality of records and supplemental data associated with the subset of records; and
     providing, in response to the one or more requests and for display in a viewport of a digital mapping of a remote communications device, the map data and the supplemental data associated with the subset of the plurality of records including a visual indication of a respective record cluster, the visual indication including a representation of a number of records in the respective record cluster and a direction of the respective record cluster relative to the map data displayed in the viewport.

10. The computing system of claim 9, wherein:

the plurality of records is a plurality of traffic records;

the respective record location of each traffic record is a respective traffic condition location;

the supplemental data includes traffic condition data associated with the subset of the plurality of records;

the subset of the plurality of records is selected based on a comparison of the traffic condition data; and the comparison of the plurality of records includes comparing the traffic condition data associated with the subset of the plurality of records.

11. The computing system of claim 9, wherein:

the subset of the plurality of records includes two or more records comprising a record cluster;

the two or more records are selected based on a respective direction of each respective record location relative to the selected region; and the supplemental data includes a number of the two or more records.

12. The computing system of any of claim 9, wherein:

each point within the viewport of a graphical user interface corresponds to a respective point of the selected region; and the supplemental data is provided for display in the viewport with the map data at one or more points of the viewport corresponding to one or more points of the selected region.

13. A method for presenting map data to a user of a communications device, the communications device being operative to access a first database external to the communications device to obtain map data describing transport routes in a mapped region, and operative to access a second database storing a plurality of records, each record being associated with one or more respective index terms and with a respective record location within the mapped region, the method comprising the communication device:

obtaining, from the first database, map data relating to a selected region which is a portion of the mapped region;

presenting the obtained map data in a display area of a screen of the communications device, each point of the display area corresponding to a respective point of the selected region under a continuous mapping;

defining one or more search criteria;

initiating a search in the second database, the search comprising:

(i) identifying any of said records for which the respective index terms match the one or more search criteria, and (ii) identifying at least one record cluster, each record cluster being associated with a respective location criterion, and each record cluster comprising a respective plurality of the identified records for which the associated record locations are outside the selected region and meet the respective location criterion; and presenting on the screen a respective visual indication of an existence of at least one record cluster, the visual indication including a representation of a number of records in the at least one record cluster and a direction of the at least one record cluster relative to the presented map data.

14. A method according to claim 13 in which the communications device initiates the search in the second database by transmitting a search instruction out of the communication device, the search instruction specifying the one or more search criteria; and the communication device receives data describing the at least one record cluster.

15. A method according to claim 13, in which at least one said visual indication is presented within the display area.

* * * * *

UNITED STATES PATENT AND TRADEMARK OFFICE
CERTIFICATE OF CORRECTION

| | | |
|---|---|---|
| PATENT NO. | : 11,402,232 B2 | Page 1 of 1 |
| APPLICATION NO. | : 16/380763 | |
| DATED | : August 2, 2022 | |
| INVENTOR(S) | : Zhou Bailiang | |

It is certified that error appears in the above-identified patent and that said Letters Patent is hereby corrected as shown below:

On the Title Page

Insert item (30), --This application claims priority to PCT/US2018/027057, filed on April 11, 2018.--

Signed and Sealed this
Third Day of September, 2024

Katherine Kelly Vidal
*Director of the United States Patent and Trademark Office*